United States Patent [19]
Ogino

[11] 3,765,257
[45] Oct. 16, 1973

[54] CONTACT PRESSURE TRANSMITTING SYSTEM OF A STEPLESS SPEED CHANGE GEAR

[75] Inventor: Yoshihisa Ogino, Kyoto, Japan

[73] Assignee: Shinpo Kogyo Kabushiki Kaisha, (Shinpo Kogyo Co. Ltd.), Kyoto, Japan

[22] Filed: Aug. 9, 1971

[21] Appl. No.: 170,240

[30] Foreign Application Priority Data
Aug. 18, 1970 Japan.............................. 45/72252

[52] U.S. Cl..................................... 74/199, 74/190
[51] Int. Cl............................................ F16h 15/08
[58] Field of Search...................... 74/191, 193, 194, 74/199, 211, 796, 208

[56] References Cited
UNITED STATES PATENTS
2,032,015 2/1936 Heynau................................ 74/193
3,530,732 7/1968 Kashihara........................ 74/796 X FOREIGN PATENTS OR APPLICATIONS
25,830 12/1935 Australia.............................. 74/199

Primary Examiner—Milton Kaufman
Assistant Examiner—Frank H. McKenzie, Jr.
Attorney—Pierce, Scheffler & Parker

[57] ABSTRACT

A variable speed transmission in which each of a plurality of conical rollers is engaged by two pairs of elements one of which drives the associated roller and the other pair is driven by the roller. In each pair one is movable axially to compensate for the variable width of the rollers and the other is fixed against any substantial axial movement and contact pressure generating means of the cam type are employed for applying pressure against one of the fixed elements of one of the pairs of elements to assure engagement of that fixed element with its associated conical element.

2 Claims, 6 Drawing Figures

CONTACT PRESSURE TRANSMITTING SYSTEM OF A STEPLESS SPEED CHANGE GEAR

This invention relates to a contact pressure transmitting system of a stepless speed change gear of friction type wherein one or more rows of thin double-conical rollers are frictionally engaged with friction wheels on a input shaft and rings arranged concentrically with the friction wheels, and wherein the thin double-conical rollers are moved so as to vary their effective radii. In the case of the above mentioned stepless speed change gear, the speed of the output shaft can be varied widely as the effective radius of the double-conical roller for the friction wheel on the input shaft and the effective radius of the double-conical roller for the ring are simultaneously varied. However, in order to make its operation sufficiently positive and elevate its mechanical efficiency and durability, it is necessary to provide a contact pressure generating device of cam type on each of the friction wheel side and the ring side.

The principal object of the present invention is to provide a contact pressure transmitting system which includes only one contact pressure generating device of cam type.

In order that the contact pressure generating device may act as expected over the entire speed range, it is necessary that the lift of its cam should be considerably large. However, if the cam is made large, an unstable state occurs transiently when the direction of torque is reversed at an instant or when the direction of rotation of the output shaft is reversed.

Other object of the present invention is to provide a contact pressure transmitting system which avoids the occurrence of the above unstable state.

The other objects and the advantages of the present invention will be apparent from the following description in connection with the accompanying drawings in which.

In this specification, the description is made by using the below defined terms.

1. In a system consisting of two or more power transmitting wheels on a driving shaft, one or more rows of thin double-conical rollers advancing and driving shaft, two or more rings are arranged concentrically with the power transmitting wheels and one or more rows of thin double-conical rollers are moved so as to vary their effective radii of frictional engagement for the power transmitting wheels and the rings simultaneously, "the innermost power wheel and the innermost ring" will be called "diagonal elements" respectively.

2. Opposed elements

In relation to the first set of diagonal elements consisting of a power transmitting wheel $A_1$ and a ring $B_2$ and the second set of diagonal elements consisting of a power transmitting wheel $A_2$ and a ring $B_1$, "the power transmitting wheels $A_1$ and $A_2$" and the "rings $B_1$ and $B_2$" will be called "opposed elements" respectively.

Four embodiments of the present invention are exemplified, and in order to simplify the illustrations, only one of the double-conical rollers is shown in each of them.

Figure 1:
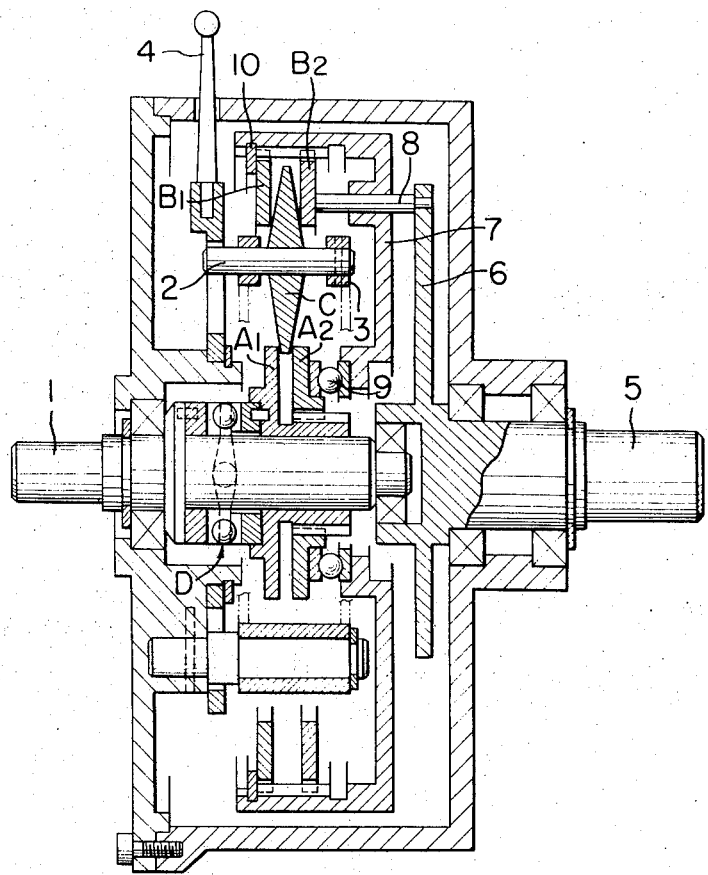
FIG. 1 is a longitudinally sectioned view of a stepless speed change gear utilizing a contact pressure transmitting system according to the present invention.

In FIGS. 1, $A_1$ and $A_2$ are power transmitting wheels on a input shaft 1. $B_2$ is a ring as a diagonal element for the power transmitting wheel $A_1$, and $B_1$ is a ring as a diagonal element for the power transmitting wheel $A_2$.

One row of thin double-conical rollers C frictionally engage with both of the opposed elements $A_1$, $A_2$ and the opposed elements $B_1$, $B_2$. The shaft 2 of these rollers is supported by a carrier 3. The double-concial rollers C are moved to vary its effective radii for the power transmitting wheels $A_1$, $A_2$ and rings $B_1$, $B_2$ through a cam means, when a handle 4 is turned.

A contact pressure generating device D of cam type is provided on the input shaft 1 so as to force the power transmitting wheel $A_1$.

Among the elements $A_1$, $A_2$, $B_1$, $B_2$, the ring $B_2$ is one of which axial displacement is prohibited. This prohibition or restriction is caused by an axially immovable output shaft 5, member 6 fixed to the output shaft 5 and a stay member 8 passing through a cup shaped splined member 7.

The diagonal element for the axially immovable ring $B_2$ is the power transmitting wheel $A_1$, and the contact pressure generating device D of cam type forces this diagonal element $A_1$. The opposed element for the power transmitting wheel $A_1$ is the power transmitting wheel $A_2$, and the axial displacement of this wheel $A_2$ is transmitted to its diagonal element $B_1$ by means of a thrust bearing 9, the splined member 7 and a snap ring 10. As previously explained, axial displacement of the ring $B_2$ as the opposed element of the ring $B_1$ is prohibited so as to generate contact pressure between the frictionally engaging members.

When the double-conical roller C advances into or retreats from the elements, power transmitting wheel $A_2$ and the ring $B_1$ moves axially by a large amount, but the axial movement required for the power transmitting wheel $A_1$ is so slight that the device D may apply a proper contact pressure.

Figure 2:
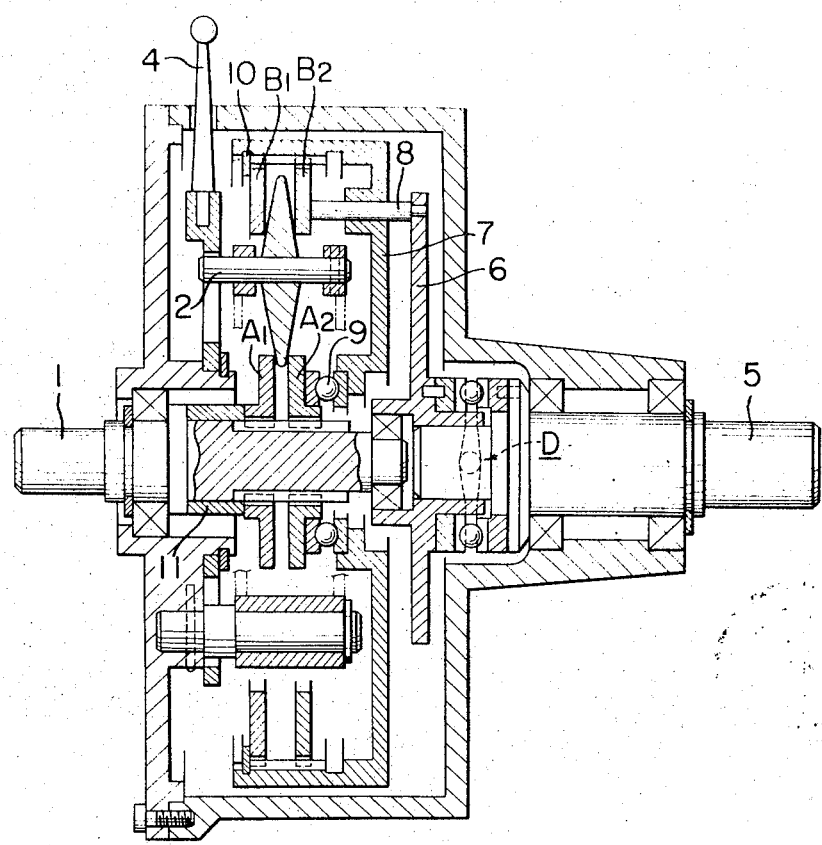
FIG. 2 is a longitudinally sectioned view of a stepless speed change gear utilizing a contact pressure transmitting system which is a modification of that shown in FIG. 1.

The embodiment shown in FIG. 1 can be modified to one wherein the contact pressure generating device D is placed on the output shaft 5 as shown in FIG. 2. In the case of this embodiment "the element of which axial displacement is prohibited" is the power transmitting wheel $A_1$ on the input shaft 1. The position of the wheel $A_1$ is determined by a sleeve 11 on the input shaft 1. The diagonal element for the wheel $A_1$ is the ring $B_2$, and the contact pressure generating device D forces this ring $B_2$. The means for operatively connecting the diagonal elements $B_1$, $A_2$ is the same as that of the embodiment shown in FIG. 1.

Figure 3:
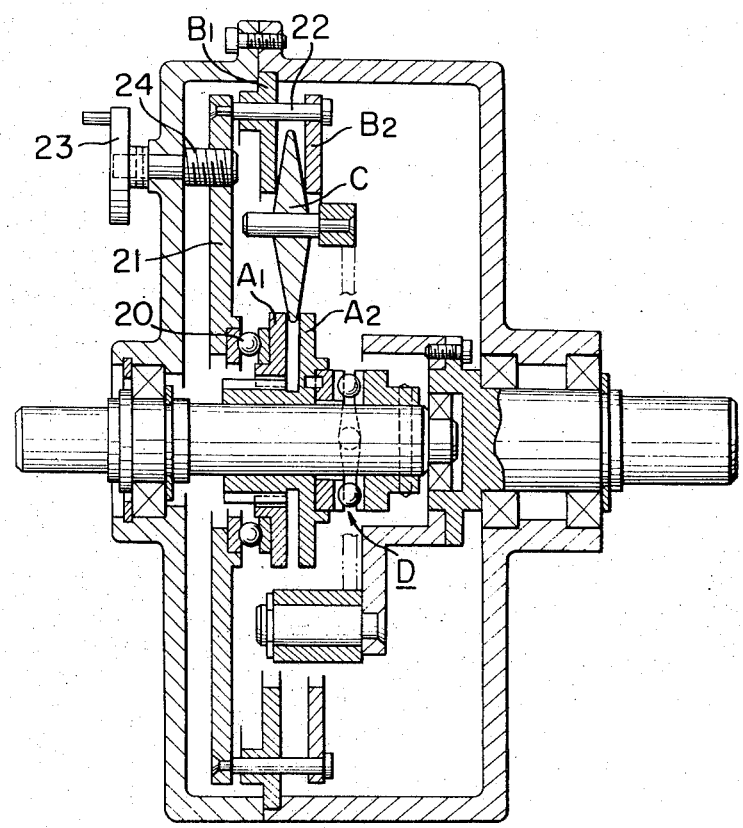
FIG. 3 is a longitudinally sectioned view of a speed change gear utilizing another contact pressure transmitting system according to the present invention.

In the case of the embodiment shown in FIG. 3, the ring $B_1$ fixed to the casing is "the element of which axial displacement is prohibited," and the contact pressure generating device D forces the power transmitting wheel $A_2$ which is the diagonal element of this ring $B_1$. The other set of diagonal elements $A_1$, $B_2$ are operatively connected by a thrust bearing 20, member 21 and a connecting rod 22 passing through the ring $B_1$. 23 is a speed-changing handle which feeds the member 21 axially by its threaded portion 24. In the type of this embodiment, a planetary motion is given to the double-conical rollers C, and the revolution of the rollers C is taken out on the output shaft through a carrier. However, in repect of attaining the object of the present invention, it is exactly the same with the embodiments shown in FIG. 1 and FIG. 2.

Figure 4:
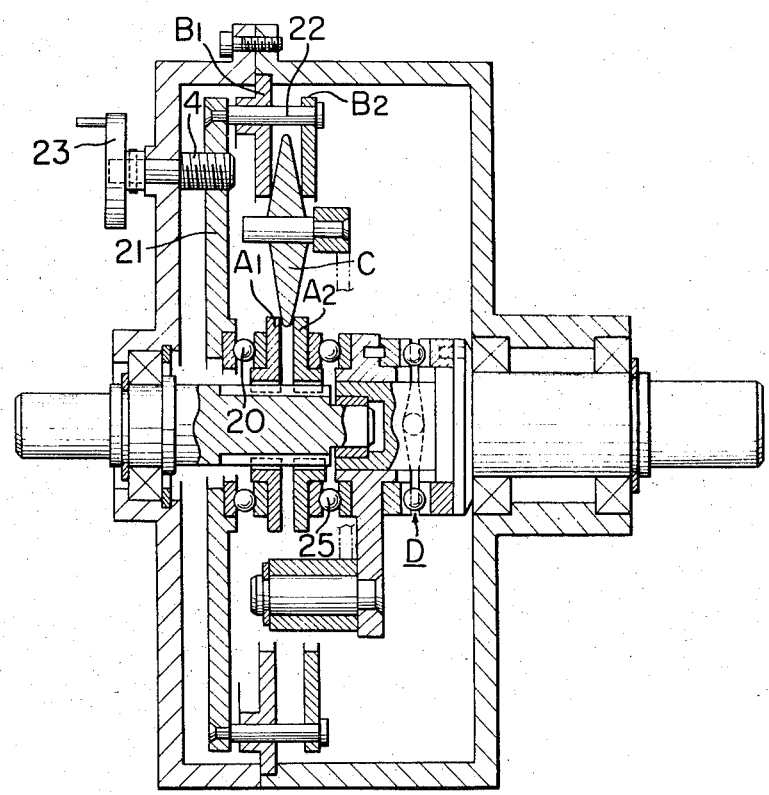
FIG. 4 is a longitudinally sectioned view of a speed change gear utilizing a contact pressure transmitting system which is a modification of that shown in FIG. 3.

In the case of the embodiment shown in FIG. 3, the contact pressure generating device D is provided on the input shaft, but can be modified to be provided on the output shaft as shown in FIG. 4. In the case of the embodiment shown in FIG. 4, a thrust bearing 25 is provided between the power transmitting wheel $A_2$ and the contact pressure generating device D. However, the contact pressure transmitting system is the same with that shown in FIG. 3.

Figure 5:
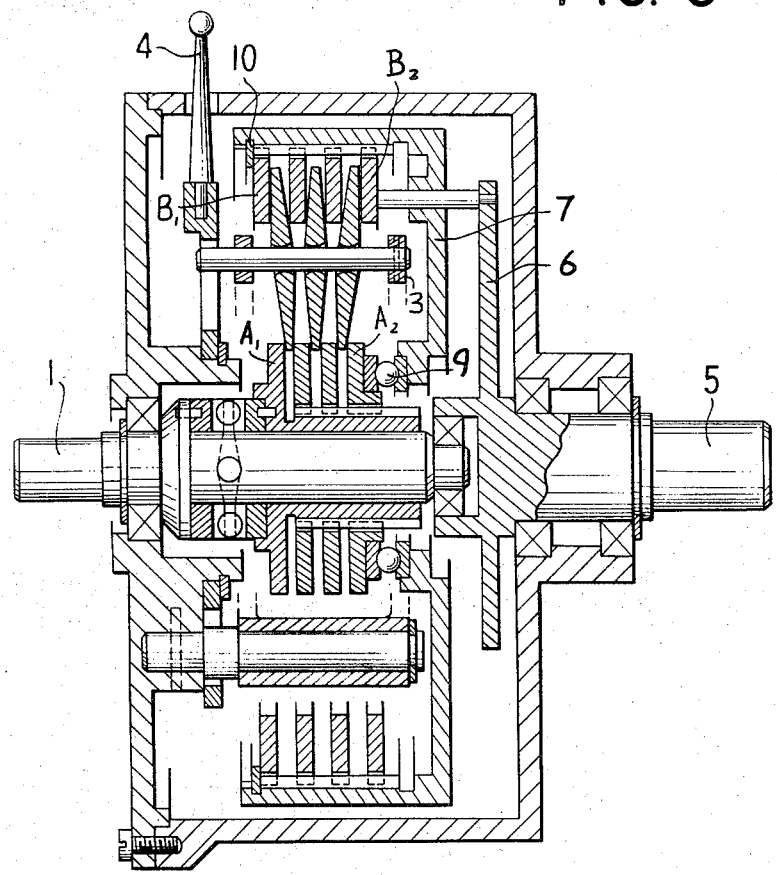
FIG. 5 is a view similar to FIG. 1 showing a stepless speed change gear wherein three rows of double-conical rollers are provided.
Figure 6:
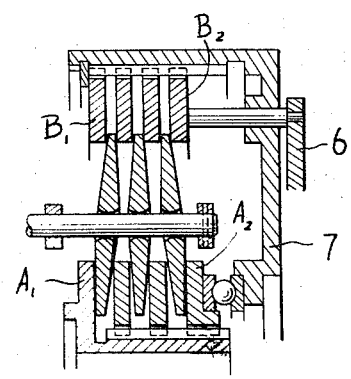
FIG. 6 is a partial view of FIG. 5 showing the double-conical rollers in the other position.

The number of rows of double-conical rollers of the stepless speed change gear can be increased to increase its power transmitting capacity. FIG. 5 and FIG. 6 show a transmission wherein three rows of double-conical rollers are provided. The construction of this stepless speed change gear is the same as that shown in FIG. 1 except for the number of rows of double-conical rollers.

As can be understood from the explanation of the above embodiments, according to the present invention, the operation of the frictional stepless speed change gear wherein the effective radii of the thin double-conical rollers are varied in two steps is made positive even when there is a large load fluctuation and the contact pressure generating device of cam type to be used may be only one.

What I claim is:

1. A variable speed transmission comprising a driving input shaft and a driven output shaft, a plurality of rotatable conical rollers movable axially along their axes, a first pair of opposed elements frictionally engaging each of said conical rollers on opposite surfaces thereof to be rotatingly driven by said input shaft to rotate each of said conical rollers, a second pair of opposed elements frictionally engaging each of said conical rollers on opposite surfaces thereof and opposed to said first pair of elements and driven by said rollers for driving said output shaft, means for moving each of said conical rollers normal to its axis of rotation for varying the effective radii between each of said rollers and its associated pairs of elements to obtain variable speed transmission, one element of each pair of elements being axially movable to compensate for the variable width of the associated conical roller and the other element of each pair of elements being fixed to prevent any substantial axial movement thereof, the axially movable elements of the first and second pair of elements being diagonally opposed to each other on opposite sides of the associated conical roller, and contact pressure generating means of the cam type for applying pressure to one of said diagonal opposed fixed elements to assure engagement with its associated conical roller.

2. A variable speed transmission as claimed in claim 1 wherein said contact pressure generating means applies pressure to the fixed element of a first pair.

* * * * *